(12) United States Patent
Coon et al.

(10) Patent No.: US 8,688,494 B2
(45) Date of Patent: *Apr. 1, 2014

(54) BROKER PRICE OPINION EVALUATION AND SCORING SYSTEM AND METHOD

(76) Inventors: Kathy Coon, Kemah, TX (US); Gwen Magrisso, Evanston, IL (US); Robert Dorsey, Oxford, MS (US)

(*) Notice: Subject to any disclaimer, the term of this patent is extended or adjusted under 35 U.S.C. 154(b) by 0 days.

This patent is subject to a terminal disclaimer.

(21) Appl. No.: 13/572,863

(22) Filed: Aug. 13, 2012

(65) Prior Publication Data

US 2012/0303420 A1    Nov. 29, 2012

Related U.S. Application Data

(63) Continuation-in-part of application No. 11/932,297, filed on Oct. 31, 2007, now Pat. No. 8,244,563.

(60) Provisional application No. 60/863,788, filed on Oct. 31, 2006, provisional application No. 60/867,909, filed on Nov. 30, 2006.

(51) Int. Cl.
*G06Q 10/00* (2012.01)

(52) U.S. Cl.
USPC .............................. 705/7.11; 705/35; 705/306

(58) Field of Classification Search
CPC ........................... G06Q 30/0278; G06Q 50/16
USPC .................................................. 705/7.11, 35
See application file for complete search history.

(56) References Cited

U.S. PATENT DOCUMENTS

| | | | | |
|---|---|---|---|---|
| 7,587,348 | B2* | 9/2009 | Liao et al. | 705/35 |
| 2001/0039506 | A1* | 11/2001 | Robbins | 705/10 |
| 2002/0133371 | A1* | 9/2002 | Cole | 705/1 |
| 2003/0093366 | A1* | 5/2003 | Halper et al. | 705/38 |
| 2005/0154657 | A1* | 7/2005 | Kim et al. | 705/30 |
| 2006/0059073 | A1* | 3/2006 | Walzak | 705/35 |
| 2008/0004893 | A1* | 1/2008 | Graboske | 705/1 |
| 2012/0278243 | A1* | 11/2012 | Frazier et al. | 705/306 |

OTHER PUBLICATIONS eAppraiseIT offers comprehensive appraisal verification, Nov. 2002, Mortgage Banking, v63, n2, p. 95.*
Hershkowitz, Brian, A New Vision for Valuation, Oct. 2004, Mortgage Banking, v65, n1, p. 138-145.*

* cited by examiner

*Primary Examiner* — Talia Crawley
(74) *Attorney, Agent, or Firm* — W. Edward Ramage; Baker Donelson (57) ABSTRACT

A system and related methods for the management and evaluation of broker price opinions comprising, a method of determining a standardized score representative of the accuracy and quality of a broker price opinion. Data from the broker price opinion is extracted and evaluated according to a plurality of rules applicable to the type of broker price opinion. Each rule is given a particular weight, and an appraisal score may be calculating by summing each instance of a rule triggered multiplied by the weight assigned to that rule. Weights may be set by experts, or determined by statistical analysis.

13 Claims, 11 Drawing Sheets

$$Score = \frac{K}{1 + e^{\sum_{j=1}^{N} w_{ij} r_j / T}}$$

Where K and T are constants, the $w_j$ are the weights and the $r_j$ are dummy variables that take on the value 1 if the rule fires and 0 otherwise.

$$Score = \frac{K}{1+e^{\sum_{j=1}^{N} w_{ij} r_j / \Gamma}}$$

Where K and Γ are constants, the $w_{ij}$ are the weights and the $r_j$ are dummy variables that take on the value 1 if the rule fires and 0 otherwise.

FIGURE 1

$$\text{Maximize } \Psi \text{ where } \Psi = \frac{\sum_{i=1}^{N} \delta_i \text{IND}(S_i < 500)}{B} + \frac{\sum_{i=1}^{N} (1-\delta_i)\text{IND}(S_i > 500)}{(N-B)}$$

$$w_j \in \Omega$$

$$\text{where } S_i = \frac{K}{1 + e^{\sum_{j=1}^{N} \frac{w_j x_{ij}}{T}}}$$

| Decile | Minimum Score | Maximum Score | Total Number | Goods | Bads | Cummul Good | Cummul Bad | Percent Bad | Difference |
|---|---|---|---|---|---|---|---|---|---|
| 1 | 109.7528 | 397.431 | | 1928 | 83 | 9.65% | 94.32% | 4.13% | 84.69% |
| 2 | 397.4408 | 462.9877 | | 2008 | 4 | 19.65% | 98.86% | 0.20% | 79.21% |
| 3 | 462.9897 | 540.8809 | | 2010 | 1 | 29.69% | 100.00% | 0.05% | 70.31% |
| 4 | 540.9239 | 590.5381 | | 2012 | 0 | 39.74% | 100.00% | 0.00% | 60.26% |
| 5 | 590.5487 | 634.7026 | | 2011 | 0 | 49.76% | 100.00% | 0.00% | 50.22% |
| 6 | 634.7221 | 675.5829 | | 2012 | 0 | 59.82% | 100.00% | 0.00% | 40.18% |
| 7 | 675.5875 | 718.8899 | | 2011 | 0 | 69.87% | 100.00% | 0.00% | 30.13% |
| 8 | 718.9278 | 765.6831 | | 2012 | 0 | 79.91% | 100.00% | 0.00% | 20.09% |
| 9 | 765.6975 | 824.664 | | 2011 | 0 | 89.95% | 100.00% | 0.00% | 10.05% |
| 10 | 824.6687 | 1000 | | 2012 | 0 | 100.00% | 100.00% | 0.00% | 0.00% |
| Total | | | | 20027 | 88 | | | | 84.69% |
| | | | At Score of 500 | | | 22.34% | 98.86% | Max Difference | 76.52% |

FIGURE 5

| Centile | Minimum Score | Maximum Score | Total Number | Number Goods | Bads | Cummul Good | Cummul Bad | Percent Bad | Difference |
|---|---|---|---|---|---|---|---|---|---|
| 1 | 109.7528 | 220.5013 | 201 | 201 | 187 | 0.99% | 15.91% | 6.97% | 14.96% |
| 2 | 220.5454 | 255.7171 | 201 | 201 | 179 | 1.85% | 40.91% | 10.95% | 39.06% |
| 3 | 256.005 | 282.9262 | 201 | 201 | 183 | 2.74% | 61.36% | 8.96% | 58.62% |
| 4 | 283.1861 | 310.4929 | 201 | 201 | 193 | 3.70% | 70.45% | 3.96% | 66.75% |
| 5 | 310.5167 | 328.3784 | 202 | 202 | 197 | 4.69% | 76.14% | 2.46% | 71.45% |
| 6 | 328.7123 | 344.4305 | 201 | 201 | 198 | 5.68% | 79.55% | 1.49% | 73.87% |
| 7 | 344.5069 | 359.4152 | 201 | 201 | 197 | 6.66% | 84.09% | 1.99% | 77.45% |
| 8 | 359.559 | 371.6461 | 201 | 201 | 195 | 7.65% | 90.91% | 2.99% | 83.27% |
| 9 | 371.6586 | 384.6742 | 201 | 201 | 200 | 8.60% | 92.05% | 0.50% | 83.41% |
| 10 | 384.6872 | 397.431 | 202 | 202 | 198 | 9.65% | 94.32% | 1.00% | 84.69% |
| 11 | 397.4408 | 407.673 | 201 | 201 | 202 | 10.64% | 94.32% | 0.00% | 83.66% |
| 12 | 407.6935 | 418.1996 | 201 | 201 | 199 | 11.63% | 96.59% | 1.00% | 84.96% |
| 13 | 418.2207 | 428.1355 | 201 | 201 | 200 | 12.65% | 97.73% | 0.50% | 85.10% |
| 14 | 428.2255 | 437.0623 | 201 | 201 | 201 | 13.63% | 97.73% | 0.00% | 84.10% |
| 15 | 437.1695 | 445.7874 | 202 | 202 | 200 | 14.63% | 98.86% | 0.50% | 84.22% |
| 16 | 445.7931 | 453.8671 | 201 | 201 | 201 | 15.63% | 98.86% | 0.00% | 83.22% |
| 17 | 453.8982 | 461.6737 | 201 | 201 | 201 | 16.64% | 98.86% | 0.00% | 82.22% |
| 18 | 461.676 | 468.7506 | 201 | 201 | 202 | 17.65% | 98.86% | 0.00% | 81.22% |
| 19 | 468.7634 | 475.5298 | 202 | 202 | 201 | 18.65% | 98.86% | 0.00% | 80.21% |
| 20 | 475.5393 | 482.9877 | 201 | 201 | 201 | 19.65% | 98.86% | 0.00% | 79.21% |
| | | | Total | 20027 | 88 | | Max Difference | | 85.10% |

BROKER PRICE OPINION EVALUATION AND SCORING SYSTEM AND METHOD

This application is a continuation-in-part of U.S. application Ser. No. 11/932,297, entitled "APPRAISAL EVALUATION AND SCORING SYSTEM AND METHOD," filed on Oct. 31, 2007 now U.S. Pat. No. 8,244,563, which claims the benefit of and priority to U.S. Provisional Application No. 60/863,788, filed Oct. 31, 2006, and U.S. Provisional Application No. 60/867,909, filed Nov. 30, 2006, and is entitled to the benefit of those filing dates, in whole or in part, for priority. The entire disclosures, specifications, drawings, appendices and attachments of U.S. application Ser. No. 11/932,297 and U.S. Provisional Application Nos. 60/863,788 and 60/867,909 are incorporated herein by specific reference for all purposes.

FIELD OF INVENTION

This invention relates to a system and method for the management, evaluation and scoring of broker price opinions. More particularly, this invention relates to a method of determining a standardized score representative of the accuracy and quality of a broker price opinions.

BACKGROUND OF INVENTION

Lenders underwriting residential and commercial property serving as collateral support a mortgage or loan typically requires an appraisal of the subject property to determine value and possible risks. Unfortunately, it is a very intensive and costly process for a lender to review each appraisal thoroughly and consistently. At present, lenders are not able to review appraisal with a sufficient level of detail systematically and economically. Problem appraisals, and problem areas in appraisals, may thus be overlooked, and the lenders may find substantial sums at risk.

Similarly, loan servicing and capital markets have used broker price opinions (BPOs) as the primary source of property valuation information. With the collapse of the real estate market, the demand for BPOs increased significantly. However, there are no consistent standards or forms for BPO reports or the data to be considered or included.

Accordingly, what is needed is a standard BPO form and an improved, automated process of BPO review that achieves a level of review heretofore not available on a systematic or economic basis.

SUMMARY OF INVENTION

In various embodiments, the present invention may be used to assist lenders with the process of underwriting the residential and other property collateral supporting a mortgage. It enables the lenders to achieve a consistent and very thorough review process of the appraisal. By using the GAAR, lenders are able to review to a level of detail that human reviewers cannot systematically and economically achieve. This then lets the expert reviewers focus on the problems areas of the appraisal and use their expertise and judgment to better address the issues that are beyond the scope of automated systems. The GAAR replaces a very manual and inconsistent review process used by lenders that was heavily dependent on the expertise and thoroughness of the individual reviewer.

In one exemplary embodiment, the GAAR has two components, Compliance and Risk. The compliance rules check to ensure that the appraisal meets regulatory requirements, such as the USPAP requirements on the appraiser and the Freddie Mac and Fannie Mae guidelines. In this way the lender can document that they are complying with regulatory requirements on 100% of their mortgage production. The risk rules inform the lender about issues that may make the property unacceptable to back the mortgage. Although numerous risk issues are identified, the specific level of risk that the lender is willing to accept is a business decision that will vary from one lender to the next.

The GAAR also is used as part of an automated underwriting process used by lenders. Weights are applied to the rules that are violated and then these weights are aggregated to create a score. This score is used to automate the underwriting process at many lenders. This speeds the review process for the lenders and thus facilitates the mortgage process and reduces costs of the process.

In one exemplary embodiment, the present invention comprises a system for calculating a GAAR Score for a real estate appraisal. Data from the appraisal is extracted and a plurality of rules are tested against the information. The rules may be compliance-based, risk-based, or both. Each rule is separately weighted, and the score may be calculated as the sum of each rule that is triggered or "fired" multiplied by the weight assigned to that rule.

In one embodiment, once the rules are coded or created, their performance is tested and evaluated by a series of test runs using data files and sources representing extracted appraisal data containing a number of known issues, including issues that result from feedback from evaluation of production appraisals. Each rule for each appraisal form is tested and evaluated to ensure that it is performing correctly. Test files and scripts are built or adjusted over time to include a wide variety of issues to ensure robust performance of the system. Production appraisal evaluations also may be reviewed to identify rules or coding that results in errors or "false positives," such as may result from variations in styles used by appraisers in the field, so that the rules or coding may be modified appropriately.

Additional testing may also be performed using a large data set of production appraisals. The "firing rate" (or the rate where a particular rule is violated or results in a "positive" hit) for each rule may be tabulated, and rules that appear to be firing too frequently can be examined. This examination may include comparisons with the actual appraisals that caused a positive hit to determine whether or not the rule should have fired. If the implementation of the rule is causing inappropriate firing, then the rule may be modified appropriately.

There are additional ways in which rules can be identified for modification. For example, a number of appraisals may be randomly selected from production, and compared to the rules to ensure that none fired inappropriately, and that there were no issues in the appraisal that should have caused a rule to fire when none were fired. It also is possible that issues might be identified that are potential problems in the appraisal for which no rules exist. Problems with the rules also may be identified by reviewers in the production environment and reported back. If any of these issues or problems are identified, then rules can be added, modified, or changed as appropriate. This allows an ongoing review of the rules to ensure that the rules are up-to-date and the evaluation system is functioning properly.

In another exemplary embodiment, a GAAR Score for an appraisal is based on all of the rules in GAAR in each form, both compliance and risk rules. The data from the appraisal is extracted or entered into the system, and then is evaluated against each rule. A weight is applied to each rule, with the total score calculated by adding the weights associated with each rule that "fires." This summation may also be transformed by an appropriate formula. Accordingly, with one formula, the higher the score, the more likely the appraisal is in compliance with accepted standards and guidelines. The scale can be inverted so that high scores are generated by those appraisals with many rules that fire, and the scale can also be changed to any scale desired.

It should be noted that the weight applicable to a particular rule may be adjusted periodically in any embodiment of the present invention.

An appraiser score may also be calculated in a similar manner, using a select subset of the rules in GAAR. This may help evaluate the appraiser's performance and diligence in completing a particular appraisal.

The development of weights to be used for each rule can vary depending on a number of factors. For example, when new forms are introduced by governmental agencies or other sources, there is often no history on how these forms have been used in the past. Thus, there is no data to identify how appraisers will use them in the future, nor is there any data associated with appraisals that have resulted in bad valuations or losses to a lender. Accordingly, statistical approaches may not be appropriate since there is little or no data to work with to estimate appropriate weights. Experts may be called upon to assign initial weights for rules, based upon the seriousness of the rule.

As another example, statistical analysis can be used to re-evaluate and re-estimate appropriate weights for rules based on experience with production appraisals with problems (e.g., appraisals that may have resulted in bad valuations or losses). This allows the system to better differentiate between appraisals with value problems and the remaining production volume. In one embodiment, the appraisals are divided into two groups: those with bad valuations and those with good valuations. The rules that fire for each appraisal are used as the explanatory variable, and the two groups are used to create the dependent variable.

In yet another embodiment, the present invention may comprise a new standard BPO report form to includes the data considered essential for a quality BPO. In another exemplary embodiment, the present invention comprises a system for calculating a BPO Score for a BPO report. Data from the BPO report is extracted and a plurality of rules are tested against the information. The rules may be compliance-based, risk-based, or both. Each rule is separately weighted, and the score may be calculated as the sum of each rule that is triggered or "fired" multiplied by the weight assigned to that rule. The calculations and analysis may use the same process as for the GAAR Score for appraisals.

DESCRIPTION OF THE DRAWINGS

FIGS. 3-6 show data from a multiple test run in accordance with one embodiment of the present invention.

DETAILED DESCRIPTION OF THE INVENTION

In several embodiments, the present invention relates to a system and related methods for the management and evaluation of real estate appraisals; more particularly, a method of determining a standardized score representative of the accuracy and quality of a real estate appraisal. In several other embodiments, the present invention relates to a system and related methods for the management, evaluation and scoring of broker price opinions (BPOs). More particularly, this invention relates to the creation of a standard BPO report form, and a method of determining a standardized score representative of the accuracy and quality of a BPO report.

GAAR

In one exemplary embodiment, a score is calculated based on Generally Accepted Appraisal Rules (GAAR), and thus may be termed a GAAR Score. GAAR are detailed rules developed to evaluate the appraisal, and there are many different rules applicable to different appraisal forms.

GAAR are developed to incorporate, at least in part, appraisal industry "best of breed" or "best of industry" practices to develop a comprehensive set of rules that will thoroughly identify risk issues within appraisals that may reflect on the valuation opinion provided by the appraiser. In one exemplary embodiment, rules may be categorized into two groups: compliance and risk. The compliance rules are based in part on the Uniform Standards of Professional Appraisal Practice (USPAP) regulations, the Freddie Mac and Fannie Mae guidelines, and the rules of various regulatory agencies. Compliance rules also may be based upon guidelines and rules from applicable sources in any jurisdiction or country, such as the Canadian Uniform Standards of Professional Appraisal Practice (CUSPAP), the Appraisal Institute of Canada, the Canada Deposit Insurance Corporation, and the Canada Mortgage and Housing Corporation in Canada. Appraisals passing compliance rules in the GAAR should be in conformance with applicable guidelines and regulatory requirements. GAAR also may be updated based on reviews of appraisals and performance with production appraisals.

An exemplary embodiment of Compliance GAAR and Risk GAAR are described below.

GAAR Compliance Rules

The GAAR descriptions use the language of the primary guiding regulatory bodies' documentation. Not all of the regulatory requirements and guidelines apply to each rule. GAAR attempts to encompass all of the various regulatory sources. Accordingly, the present invention calls for the application and inclusion of the relevant regulatory guidelines, expectations, or risk avoidance screens, as necessary and dictated by the particular element of the appraisal report being examined.

Some elements of an appraisal cannot be efficiently automated without incurring some false/positive firings, the result of nuances too slight for accurate standardized testing. GAAR should therefore not be understood to perform an absolute all-inclusive compliance audit, but is rather a tool by which the overwhelming majority of real estate appraisals can be screened for overall adherence to regulatory guidelines.

The following examples use a particular naming system, although other naming conventions or systems may be used in other embodiment. The first element ("FNC") represents a particular company name and serves to distinguish the GAAR Compliance Rules in this embodiment from other business rules. The second designation "C" references the particular rule-set, in this case the GAAR "C"ompliance Rules. The third element designates a particular section of the appraisal form (e.g., SUB designates the rules applicable to the SUBJECT section of the Fannie Mae Form 1004 and Freddie Mac Form 70; IMP for IMPROVEMENTS; CA for COST APPROACH, and so on). The numbers in the fourth and fifth element corresponds to the Rule number and sections within the particular subset indicated by the two prior designations (e.g., C-SUB).

Accordingly, the rule groupings in this exemplary embodiment fall into the following categories found on the Uniform Residential Appraisal Report: Fannie Mae (1004) and Freddie Mac (70):

FNC-C-ATT-xxx-xx: Required ATTACHMENTS for appraisal reports

FNC-C-CMS-xxx-xx: CMS-Specific Rules—work in conjunction with GAAR

FNC-C-SUB-xxx-xx: The SUBJECT section

FNC-C-CONT-xxx-xx: The CONTRACT section

FNC-C-N-xxx-xx: The NEIGHBORHOOD section

FNC-C-S-xxx-xx: The SITE section

FNC-C-IMP-xxx-xx: The IMPROVEMENTS section

FNC-C-SCA-xxx-xx: The SALES COMPARISON APPROACH section

FNC-C-SCAHIS-xxx-xx: The SALES HISTORY section

FNC-C-SCAVALUE-xxx-xx: The VALUE by the Sales Comparison Approach

FNC-C-REC-xxx-xx: The RECONCILIATION section

FNC-C-MKTVALUE-xxx-xx: The MARKET VALUE section

FNC-C-RECDATE-xxx-xx: The EFFECTIVE DATE of the appraisal

FNC-C-CA-xxx-xx: The COST APPROACH to value

FNC-C-PUDINFO-xxx-xx: The PUD INFORMATION section

FNC-C-CERT-xxx-xx: The CERTIFICATION and SIGNATURE sections

Specific examples of GAAR Compliance Rules are set forth in U.S. application Ser. No. 11/932,297, entitled "APPRAISAL EVALUATION AND SCORING SYSTEM AND METHOD," filed on Oct. 31, 2007, which is incorporated herein in its entirety by specific reference for all purposes.

GAAR Risk Rules

Naming conventions are similar to those discussed above for GAAR Compliance Rules. Exemplary GAAR Risk Rules for particular appraisal report forms also are set forth in U.S. application Ser. No. 11/932,297, entitled "APPRAISAL EVALUATION AND SCORING SYSTEM AND METHOD," filed on Oct. 31, 2007, which is incorporated herein in its entirety by specific reference for all purposes.

GAAR Score

In an exemplary embodiment of a system for calculating a GAAR Score, each of the above rules is coded so that data (including but not limited to XML data) that is extracted from an appraisal (and that may be delivered from a data extraction source) can be run by an independent program. Rules may be designed so that rules will run exactly the same regardless of the source of the data, which may include, but is not limited to, OCR (Optical Character Recognition), PDF extraction, or AI Ready files.

Once the rules are coded or created, their performance is tested and evaluated by a series of test runs using data files and sources representing extracted appraisal data containing a number of known issues, including issues that result from feedback from evaluation of production appraisals. Each rule for each appraisal form is tested and evaluated to ensure that it is performing correctly. Test files and scripts are built or adjusted over time to include a wide variety of issues to ensure robust performance of the system. Production appraisal evaluations also may be reviewed to identify rules or coding that results in errors or "false positives," such as may result from variations in styles used by appraisers in the field, so that the rules or coding may be modified appropriately.

Additional testing may also be performed using a large data set of production appraisals. The "firing rate" (or the rate where a particular rule is violated or results in a "positive" hit) for each rule may be tabulated, and rules that appear to be firing too frequently can be examined. This examination may include comparisons with the actual appraisals that caused a positive hit to determine whether or not the rule should have fired. If the implementation of the rule is causing inappropriate firing, then the rule may be modified appropriately.

There are additional ways in which rules can be identified for modification. For example, a number of appraisals may be randomly selected from production, and compared to the rules to ensure that none fired inappropriately, and that there were no issues in the appraisal that should have caused a rule to fire when none were fired. It also is possible that issues might be identified that are potential problems in the appraisal for which no rules exist. Problems with the rules also may be identified by reviewers in the production environment and reported back. If any of these issues or problems are identified, then rules can be added, modified, or changed as appropriate. This allows an ongoing review of the rules to ensure that the rules are up-to-date and the evaluation system is functioning properly.

Figure 1:
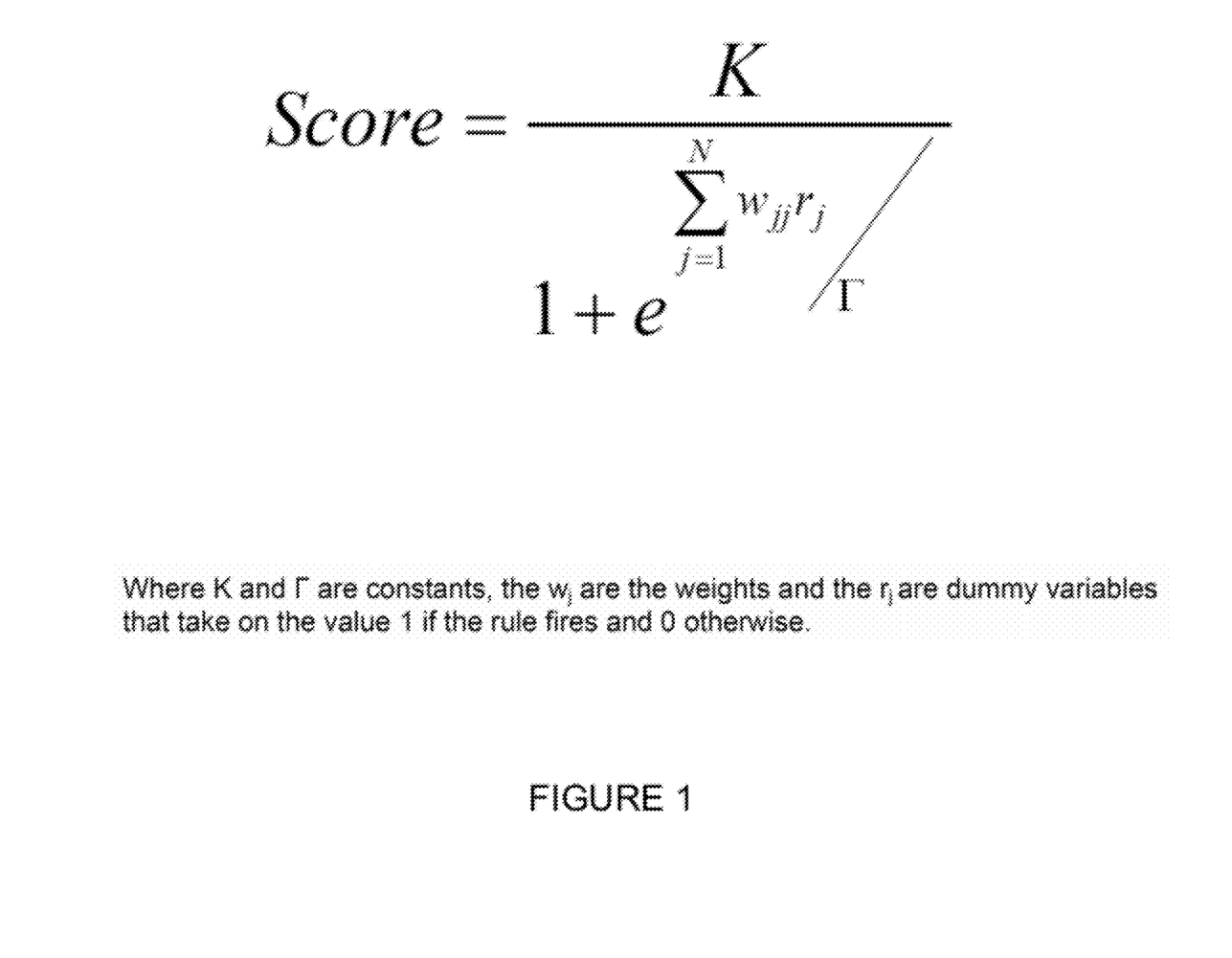
FIG. 1 shows an equation for one embodiment of the present invention.
Figure 7:
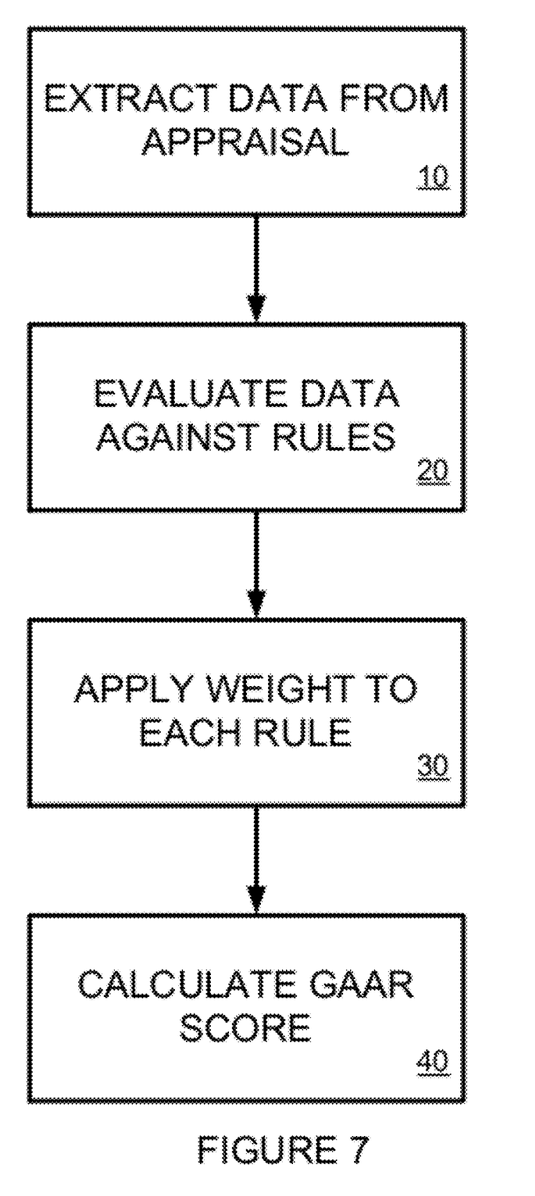
FIG. 7 shows a diagram of steps in one exemplary method in accordance with one embodiment of the present invention.

In an exemplary embodiment, a GAAR Score for an appraisal is based on all of the rules in GAAR in each form, both compliance and risk rules. As shown in FIG. 7, the data from the appraisal is extracted or entered into the system 10, and then is evaluated against each rule 20. A weight is applied to each rule 30, with the total score calculated by adding the weights associated with each rule that "fires" 40. This summation may also be transformed by an appropriate formula; FIG. 1 shows a formula for one exemplary embodiment of the invention. With this formula, in general, the higher the score, the more likely the appraisal is in compliance with accepted standards and guidelines. The particular formula shown in FIG. 1 gives a score from 0 to 1000, with low scores being generated by those appraisals with many rules that fire. Of course, the scale can be inverted so that high scores are generated by those appraisals with many rules that fire, and the scale can also be changed to any scale desired (e.g., 0 to 1.000; −500 to 500). It should be noted that the weight applicable to a particular rule may be adjusted periodically in any embodiment of the present invention.

An Appraiser Score may also be calculated in a similar manner, using a select subset of the rules in GAAR. This may help evaluate the appraiser's performance and diligence in completing a particular appraisal.

The development of weights to be used for each rule can vary depending on a number of factors. For example, when new forms are introduced by governmental agencies or other sources, there is often no history on how these forms have been used in the past. Thus, there is no data to identify how appraisers will use them in the future, nor is there any data associated with appraisals that have resulted in bad valuations or losses to a lender. Accordingly, statistical approaches may not be appropriate since there is little or no data to work with to estimate appropriate weights. Experts may be called upon to assign initial weights for rules, based upon the seriousness of the rule.

As another example, statistical analysis can be used to re-evaluate and re-estimate appropriate weights for rules based on experience with production appraisals with problems (e.g., appraisals that may have resulted in bad valuations or losses). This allows the system to better differentiate between appraisals with value problems and the remaining production volume. In one embodiment, the appraisals are divided into two groups: those with bad valuations and those with good valuations. The rules that fire for each appraisal are used as the explanatory variable, and the two groups are used to create the dependent variable.

Figure 2:
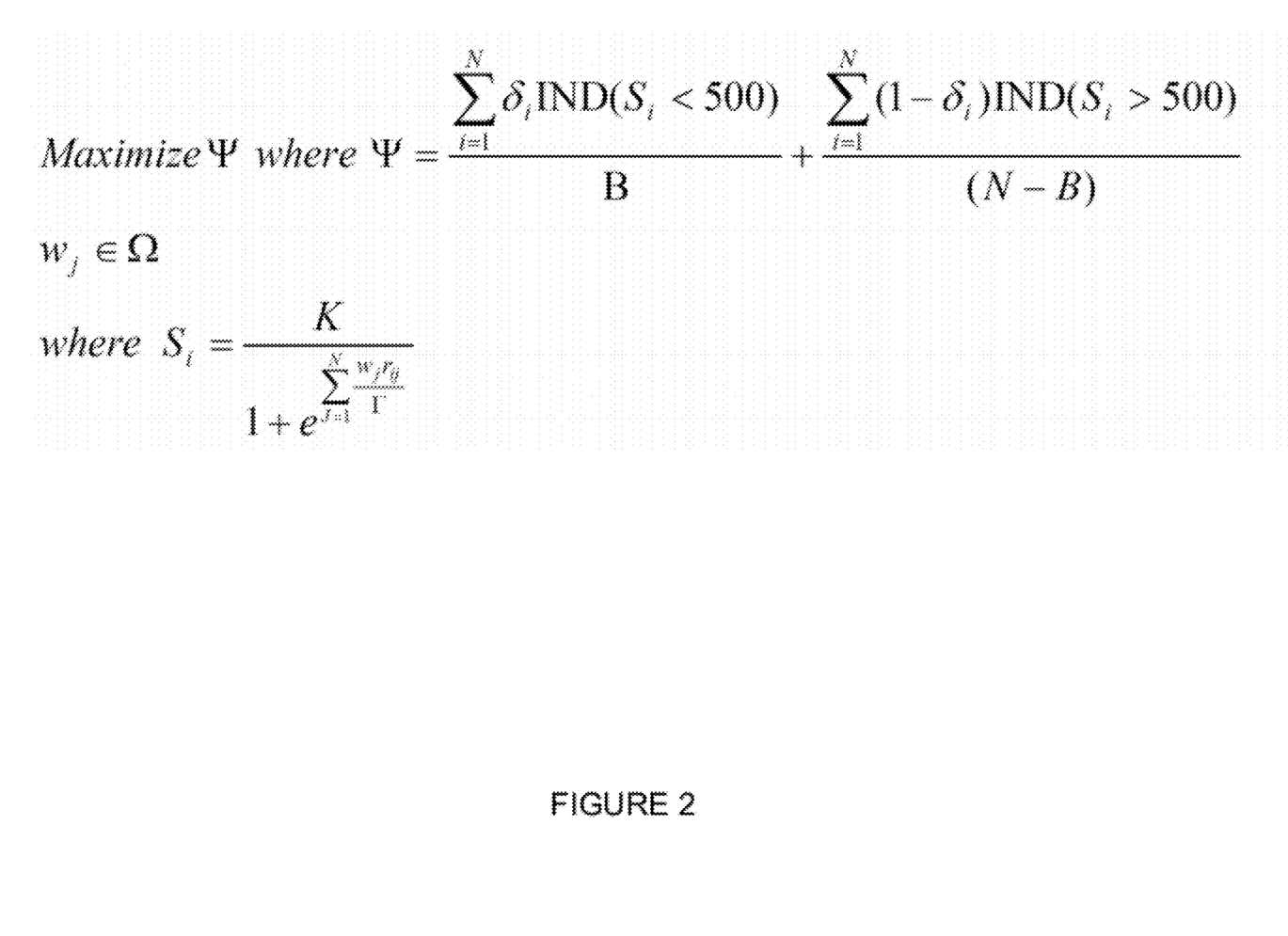
FIG. 2 shows another equation for one embodiment of the present invention.
Figure 3:
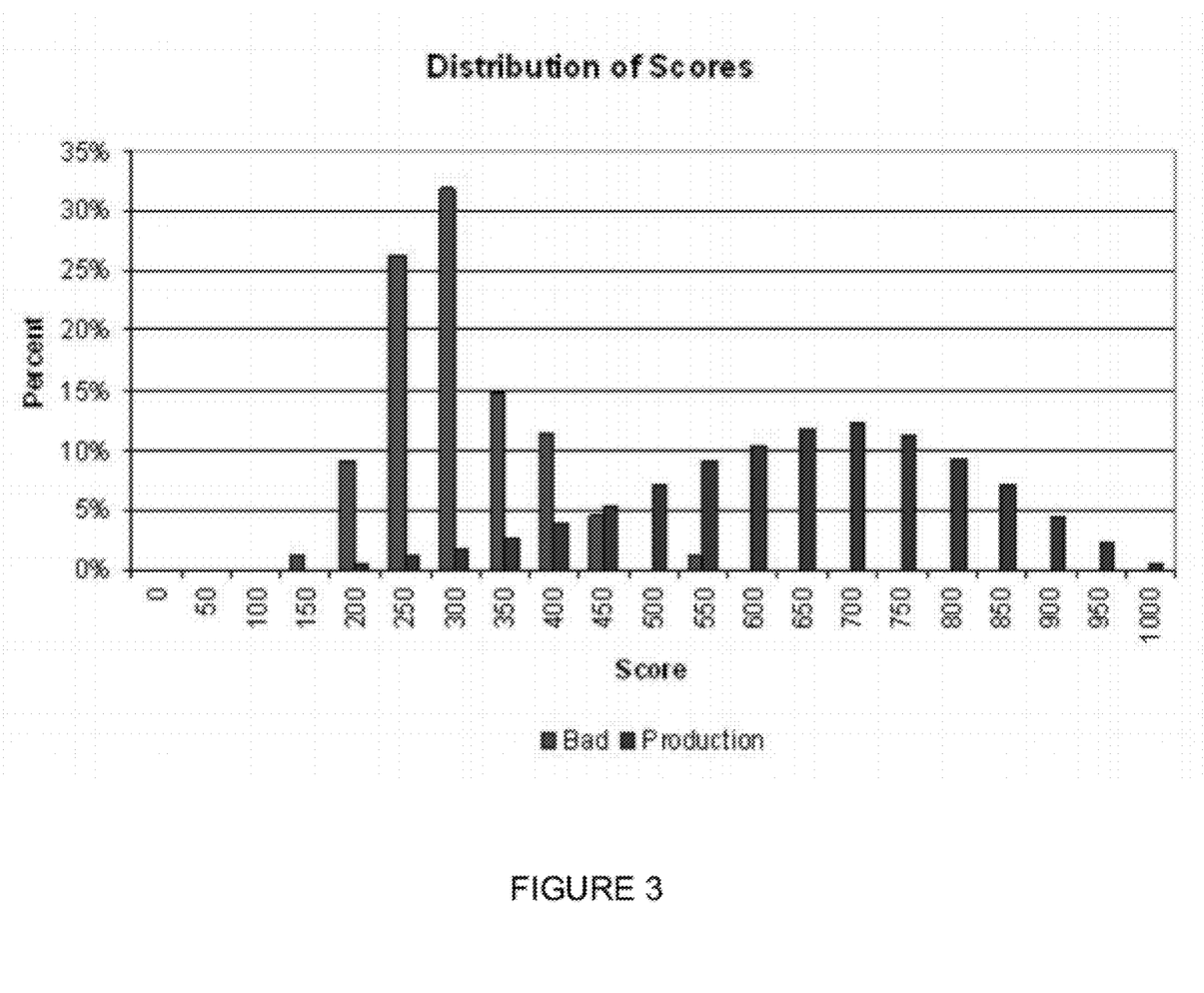
Figure 4:
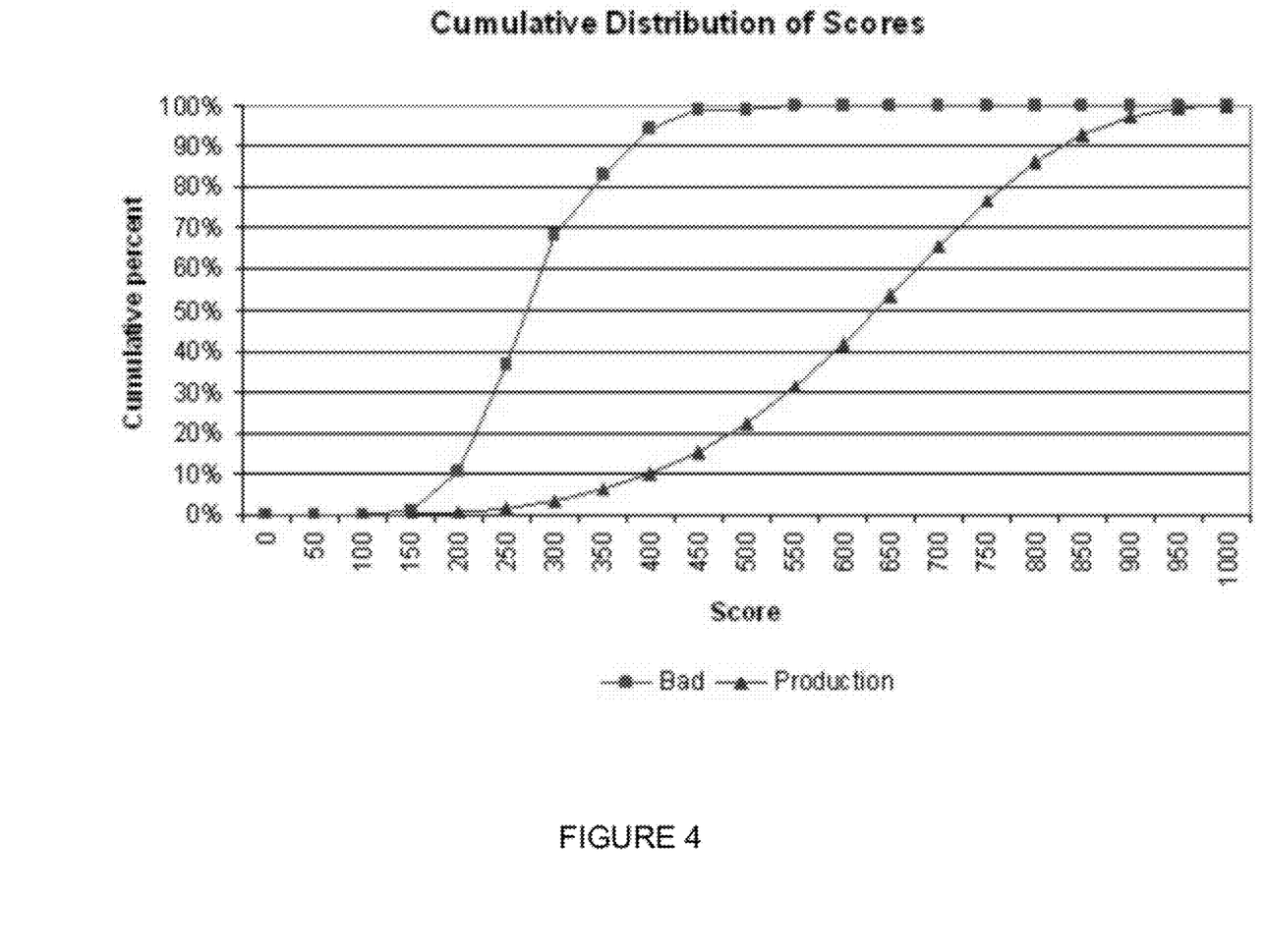
Figure 5:
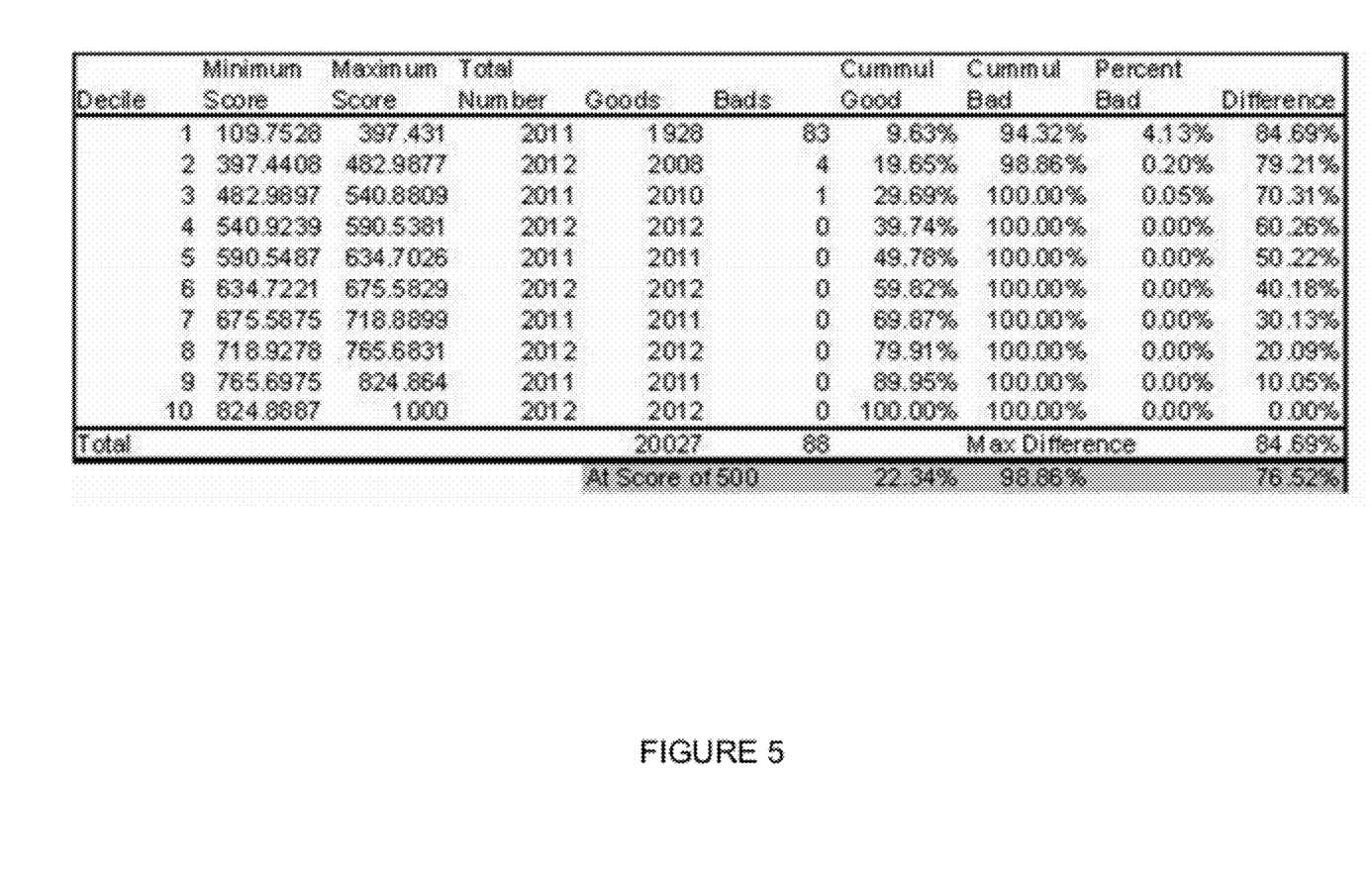

The optimization problem for developing the score can then be summarized as follows:

Let the number of files be designated as N with the number of bad valuations equal to B. $\delta$ is a vector taking a value of 1 when the observation has a bad value and 0 otherwise. The total number of rules can be indicated as R and the matrix r has N rows and R columns with each component $r_{ij}$ taking the value of 1 if the jth rule fires on the ith observation and zero otherwise. Let K and $\Gamma$ be constants. The optimization problem then is as shown in FIG. 2. A genetic algorithm may be used to estimate the appropriate weights.

With every set of weights developed, a large number of production appraisals can be scored and the distribution of resulting scores computed. Samples may be taken from both tails of the distribution and analyzed to see if the scores accurately reflect the quality of the appraisals. Distribution of the scores also may assist in defining rules for automation of the appraisal review process.

In one exemplary embodiment, each rule in the system being used to evaluate production appraisals may be assigned its own version number. Thus, any report about any specific appraisal can be documented and reproduced as to the details of the specific rule or rules that fired. Archives may be maintained of past rules so that the coding of the specific rule can be reviewed as needed.

FIGS. 3-7 show an example of a distribution of GAAR Scores for an aggregate of appraisal data from many different lenders, thousands of appraisers, and an extensive distribution of geographical locations, including all major metropolitan markets. In this particular example, 20,027 recent form 1004 production appraisals were combined with 88 "bad" appraisals known to have significant valuation problems after a detailed review. All data was extracted from the appraisals and run through the system to result in the distribution of GAAR Scores shown.

In one exemplary embodiment, a lender or other user of appraisals can use the present invention to automatically pull data from appraisals and determine a GAAR Score for that appraisal. The GAAR Score can then be used to determine whether further action or review is required with regard to that appraisal or matter. The distribution of GAAR scores for all appraisals may be monitored periodically, such as on a weekly basis, to determine consistency.

The system for calculating a GAAR Score also may be located on one or more servers on the Internet, and used by multiple lenders or users thereby.

Figure 8:
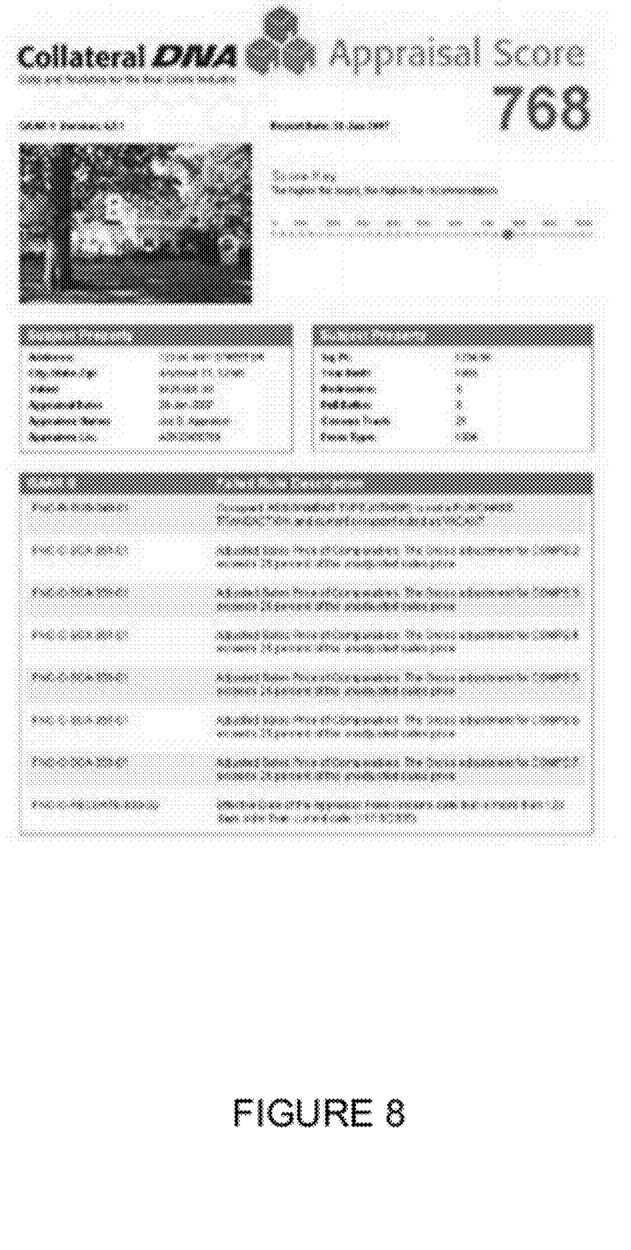
FIG. 8 shows an example of a GAAR Score report.

FIG. 8 shows an example of a GAAR Score report. It shows information about the property and appraisal, a picture of the property, the GAAR Score, the degree to which the appraisal is compliant, and a list of rules that have failed (i.e., been fired or triggered).

BPO Form and Rules

Figure 9:
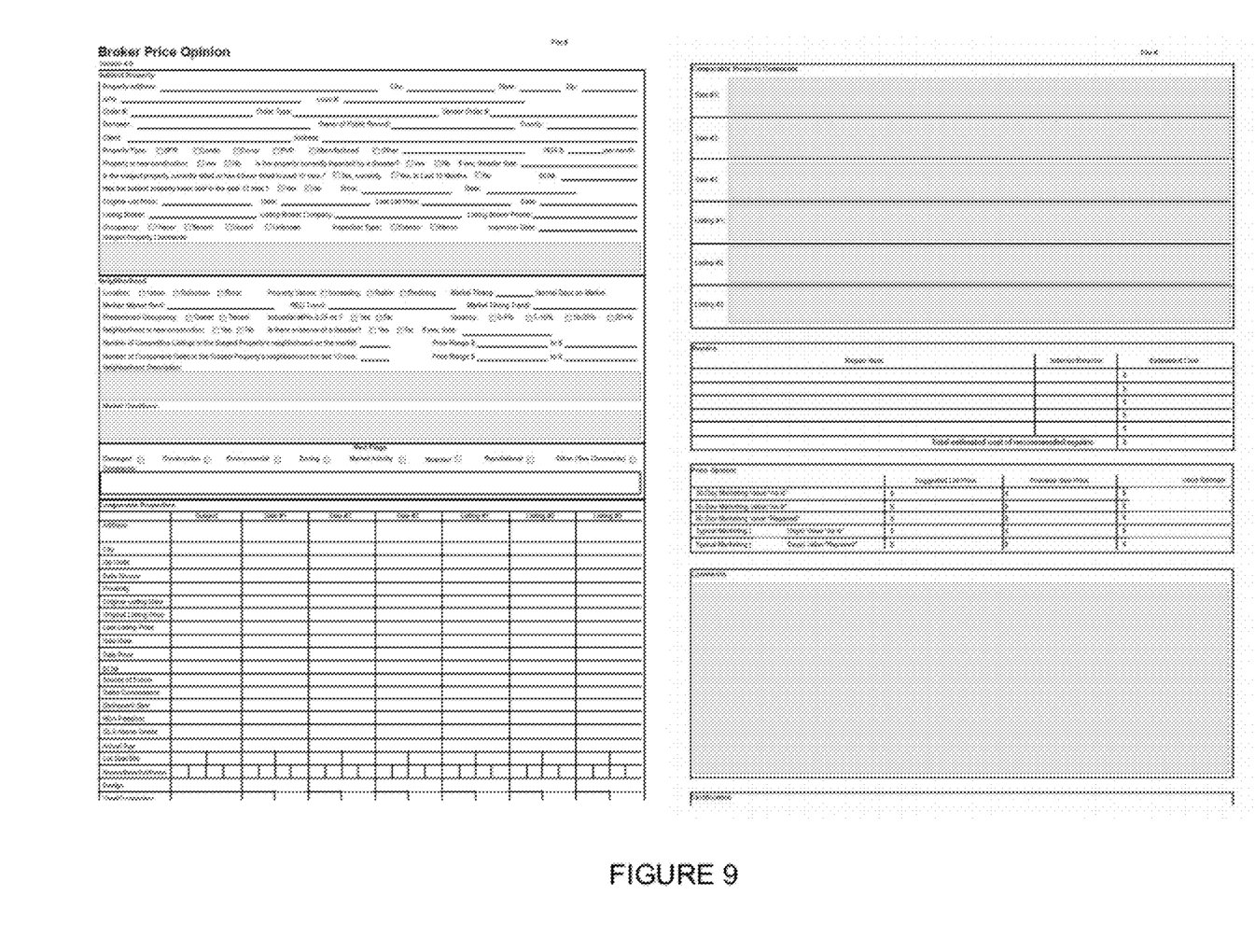
FIG. 9 shows an example of a new BPO standard report form in accordance with one embodiment of the present invention.

In another embodiment, the present invention comprises a standard BPO report form as seen in FIG. 9. The BPO report form comprise common data elements across all BPO reports previously used in the industry, and includes additional information considered to be essential by practitioners. With this standard BPO report form, rules have been created for evaluation and calculation of a BPO Score.

In one exemplary embodiment, the rules applied to the BPO report comprise report completeness rules (i.e., determining whether fields are completed properly), risk rules, and external rules.

An example of rules are attached hereto as an appendix hereto, which is incorporated herein by specific. These examples use a particular naming system similar to the one described above, although other naming conventions or systems may be used in other embodiment. The first element ("FNC") represents a particular company name. This can be used to distinguish rules herein from other business rules from other entities (such as regulatory entities). The second designation references the particular rule set (e.g., EXT for EXTERNAL rules or BPO for BPO report rules) The third element designates a particular type of external rule or a particular section of the BPO standard report form (e.g., MKT designates external MARKET rules, PROP designates external PROPERTY rules, VAL designates external VALUE rules, SUB designates the rules applicable to the SUBJECT PROPERTY section of the form, N designates rules applicable to the NEIGHBORHOOD section, RF designates rules applicable to the RED FLAGS section, COMPSALES designates rules applicable to the COMPARABLE PROPERTIES SALES sub-section, COMPLIST designates rules applicable to the COMPARABLE PROPERTIES LISTINGS sub-section, CPC designates rules applicable to the COMPARABLE PROPERTIES COMMENTS sub-section, REP designates rules applicable to the REPAIRS section, PRICEOP designates rules applicable to the PRICE OPINION section, COMM designates rules applicable to the COMMENTS section, and CERT designates rules applicable to the CERTIFICATION section. The numbers in the fourth and fifth element corresponds to the Rule number and sections within the particular subset of rules.

BPO Score

Figure 10:
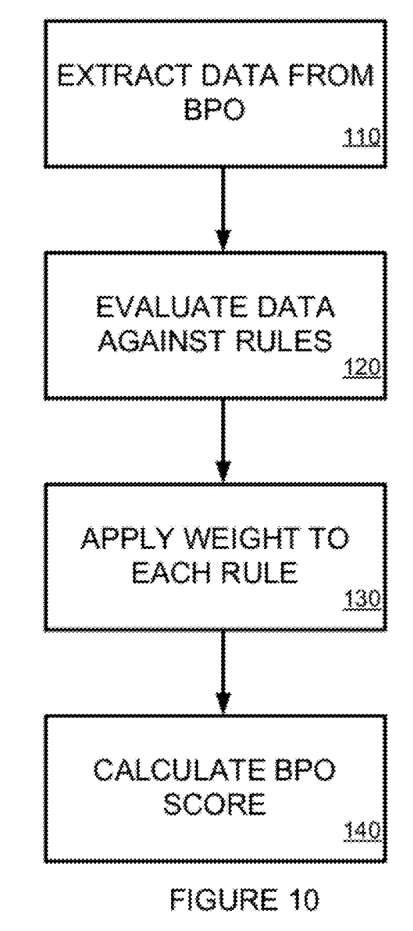
FIG. 10 shows a diagram of steps in one exemplary method in accordance with one embodiment of the present invention.

In one exemplary embodiment, a BPO Score for a BPO standard report is based on all of the rules described above. As shown in FIG. 10, the data from the BPO report is extracted or entered into the system 110, and then is evaluated against each rule 120. A weight is applied to each rule 130, with the total score calculated by adding the weights associated with each rule that "fires" 140. The calculation of the BPO Score is performed using the same equations and in the same manner as described above with regard to the GAAR Score, including, but not limited to, the adjustment of weights and rules based upon statistical analysis of a plurality of broker price opinions. This method may also be used to evaluate a broker giving a price opinion.

Figure 11:
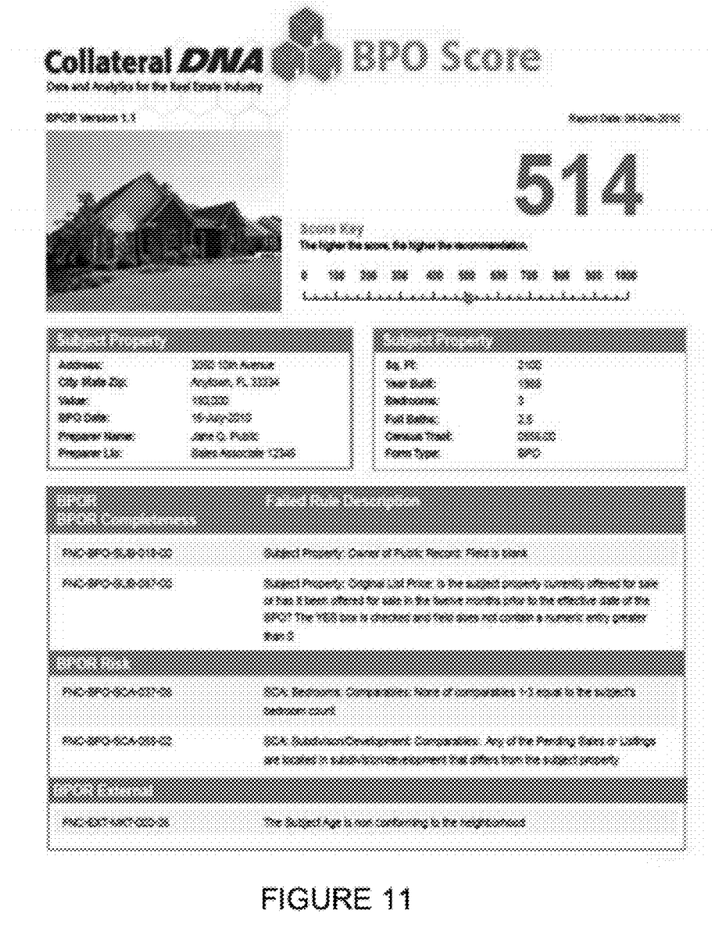
FIG. 11 shows an example of a BPO Score report.

FIG. 11 shows an example of a BPO Score report. It shows information about the property and broker price opinion, a picture of the property, the BPO Score, and a list of rules that have failed (i.e., been fired or triggered). These rules may be shown in an order consistent with the order of the data within the BPO.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A computer-implemented method for evaluating a broker price opinion, comprising the steps of:
   extracting data from the broker price opinion;
   in a computer processor or microprocessor, evaluating the extracted data against a plurality of rules applicable to the type of broker price opinion, wherein each rule is assigned a particular weight; and
   automatically calculating in a computer processor or microprocessor a broker price opinion score based on the evaluation, wherein the broker price opinion score is calculated by summing the total of each rule that is triggered multiplied by the weight assigned to that rule, according to the following formula:

$$\text{Score} = \frac{K}{1 + e^{\sum_{j=1}^{N} w_{jj} r_j / \Gamma}}$$

where N rules are evaluated, K is a constant, F is a constant, w is the weight of a rule, and r is a variable that defaults to 0 but takes on the value 1 if the rule triggers or fires.

2. The method of claim 1, wherein the rules address whether the broker price opinion complies with an applicable standard.

3. The method of claim 1, wherein the rules address the presence of certain risk factors in the appraisal.

4. The method of claim 1, wherein one or more weights are set by one or more experts in the field of broker price opinions.

5. The method of claim 1, wherein one or more weights may be adjusted over time.

6. The method of claim 1, wherein one or more weights are set or adjusted based on statistical analysis of a plurality of broker price opinions being subjected to the method.

7. A computer-implemented method for evaluating a broker, comprising the steps of:
   extracting data from an broker price opinion performed by the broker;
   in a computer processor or microprocessor, evaluating the extracted data against a plurality of rules applicable to the type of broker price opinion, wherein each rule is assigned a particular weight; and
   automatically calculating in a computer processor or microprocessor a broker price opinion score based on the evaluation, wherein the broker price opinion score is calculated by summing the total of each rule that is triggered multiplied by the weight assigned to that rule, according to the following formula:

$$\text{Score} = \frac{K}{1 + e^{\sum_{j=1}^{N} w_{jj} r_j / \Gamma}}$$

where N rules are evaluated, K is a constant, F is a constant, w is the weight of a rule, and r is a variable that defaults to 0 but takes on the value 1 if the rule triggers or fires.

8. The method of claim 7, wherein the rules address whether the broker price opinion complies with an applicable standard.

9. A machine for evaluating a broker price opinion, comprising:
   a processor or microprocessor coupled to a memory, wherein the processor or microprocessor is programmed to evaluate a broker price opinion by:
   extracting data from the broker price opinion;
   evaluating the extracted data against a plurality of rules applicable to the type of broker price opinion, wherein each rule is assigned a particular weight; and
   calculating an appraisal score based on the evaluation, wherein the broker price opinion score is calculated by summing the total of each rule that is triggered multiplied by the weight assigned to that rule, according to the following formula:

$$\text{Score} = \frac{K}{1 + e^{\sum_{j=1}^{N} w_{jj} r_j / \Gamma}}$$

where N rules are evaluated, K is a constant, F is a constant, w is the weight of a rule, and r is a variable that defaults to 0 but takes on the value 1 if the rule triggers or fires.

10. The machine of claim 9, wherein the rules address whether the broker price opinion complies with an applicable standard.

11. The machine of claim 9, wherein the rules address the presence of certain risk factors in the broker price opinion.

12. The machine of claim 9, wherein one or more weights may be adjusted over time.

13. The machine of claim 9, wherein one or more weights are set or adjusted based on statistical analysis of a plurality of broker price opinions being subjected to the method.

* * * * *